United States Patent Office 3,147,092
Patented Sept. 1, 1964

3,147,092
GAS REFORMING METHOD AND CATALYST AND
PROCESS FOR PREPARING THE SAME
Robert M. De Baun, Old Greenwich, and Malden W.
Michael, Stamford, Conn., assignors to American Cyanamid Company, New York, N.Y., a corporation of
Maine
No Drawing. Filed Oct. 26, 1961, Ser. No. 147,732
7 Claims. (Cl. 48—196)

The present invention relates to an improved gas reforming catalyst and more particularly to gas reforming catalysts of the type employed in ammonia synthesis, and to a process for preparing the same.

More particularly, the present invention relates to a nickel-gas reforming catalyst of improved activity suitable for use in the reforming of lower hydrocarbons with steam for the production of hydrogen and carbon oxides, and to a method of preparing such catalyst.

Catalysts of the type contemplated by the instant invention are in general well known and may be prepared by a number of methods known to those skilled in the art. Typically such catalysts may be prepared by reacting a nickel salt solution with an alkaline material such as aqueous soda ash to precipitate a nickel carbonate. Such a precipitate is then mixed with a suitable carrier or mixture of carriers such as various clays, i.e., kaolin, magnesia, wood flour, alpha-cellulose and others known to those skilled in the art. Thereafter, such compositions are calcined to provide what is sometimes termed a dry ignition mix. Such an ignition mix may then be intermixed with a suitable binder such as a hydraulic cement, water and a mold lubricant and thereafter formed into pills, pellets, extruders, rings or other forms well known to those skilled in the art.

Reforming catalysts resulting from such procedures and from improved procedures, as for example that described in U.S.P. 2,825,700, are in general satisfactory. However, such catalysts are nearly always subject to improvement and significant improvements in activitiy without the sacrifice of other properties is always a desirable objective for apparent reasons.

Accordingly, it is an object of the present invention to provide an improved nickel catalyst for use in reforming lower hydrocarbons with steam.

It is a further object of the present invention to provide a specific process for preparing such nickel catalyst of the type used in the reforming of lower hydrocarbons with steam, which process may be readily adapted to conventional plant equipment and is characterized by freedom from complex and costly manipulative procedures.

It is a further object of the present invention to provide an improved process for reforming lower hydrocarbons, and particularly methane, with steam at temperatures of 400° to 1000° C. employing the catalyst of improved activity of the instant invention.

These and other objects and advantages of the present invention will become more apparent from the detailed description thereof set forth hereinbelow.

In accordance with the present invention, an improved reforming catalyst is provided by an improved process, which process comprises preparing a formed catalyst from nickel carbonate and a hydraulic cement. The composition comprising nickel carbonate and a hydraulic cement is then converted to a conventional catalyst form, as for example by extruding the mixture, and then calcining the resulting extrudates.

Thereafter, the calcined extrudates, pills, Raschig rings or other forms are impregnated with a small amount (less than about 2.5% based on the total weight of the catalyst) of a manganese compound which is capable of being converted to its oxide upon calcination.

After impregnation of the calcined formed catalyst material with the manganese compound they are subsequently calcined a second time to convert the manganese compound to its oxide.

The nickel carbonate employed in the process of this invention may be prepared by several methods, as for example by the precipitation from a solution of a suitable nickel salt such as nickel nitrate hexahydrate by the addition thereto of an alkali such as soda ash followed by filtration and washing to remove or reduce traces of alkali to below acceptable limits. The nickel carbonate may be employed in the process of this invention as a wet filter cake or a dried material obtained by the reaction set forth hereinabove or from other known sources. When employed as a filter cake, it may be prepared in accordance with the procedure set forth in U.S.P. 2,825,700, referred to hereinabove, the subject matter of which is incorporated herein by reference.

Any desirable hydraulic binding agent or cement may be employed such as those which contain about 10% or more of an alkaline earth metal oxide. Alumina cements have also been found to be very satisfactory. Lumnite cement, which contains calcium aluminate as its primary constituent, is particularly desirable where high activity is desired for low temperature conditions such as is frequently required for ammonia synthesis.

Portland cement or its equivalent may also be employed. The nickel carbonate, cement, and optionally carrier materials are thoroughly mixed as in a pug mill, ribbon blender or the like usually along with a mold or extrusion lubricant before being formed as by extrusion. As noted, so formed catalysts are then calcined.

To the calcined formed catalyst base (the nickel oxide precursor, i.e., nickel carbonate with or without carrier materials for the nickel of the type identified above and the hydraulic cement binding agent) a manganous salt capable of being converted to its oxide upon calcination is added. Suitable manganous salts include manganous chloride, manganous nitrate, sulfate, acetate and various organic salts of manganese. The base material is impregnated with the manganous salt in an amount sufficient to incorporate from between about .5 and about 2.5% of manganese oxide based on the weight of the final catalyst composition and preferably an amount of from between .5 and 1.5% based on said weight.

Catalysts prepared in accordance with the present invention will normally contain from between .5 and 2.5% manganese oxide and preferably from between .5 and 1.5% thereof, between 10 and 40% of nickel oxide and preferably from between 15 and 30% thereof and the balance of such composition normally being primarily the cement binding agent which may be employed in an amount of from between 25 and 50% based on the weight of the final catalyst composition. Optionally, as indicated above, various carriers such as kaolin, magnesia, celite, alpha-cellulolse, wood flour and rework catalyst material or other suitable carriers or mixtures thereof may be employed in amounts of from 10 to 25% of the catalyst formulations based on its final dry weight.

In accordance with the process aspects of the instant invention, it has been determined that in order to achieve the unexpected improvement in activity by the addition of manganese oxide, that the manganous salts must be added to calcined formed catalyst base as distinguished from addition to the raw mix prior to forming the catalyst and calcining. Only when calcined formed catalyst base is so impregnated and then subsequently calcined is improved activity obtained.

In preparing the formed catalyst, the nickel oxide precursor, the hydraulic cement and optionally carrier materials are thoroughly mixed or blended, usually with a mold or extrusion lubricant such as graphite, fatty acid soaps and the like. The mixture is thereafter extruded or otherwise formed into pellets and subsequently calcined at temperatures of from between 700° and 1400° F. The calcined pellets are then preferably impregnated by dipping or immersing the pellets or rings into a solution of the manganous salt in such a manner as to become impregnated with a predetermined amount of said salt capable of being converted to manganous oxide. Preferably during such immersion or dipping the catalyst pellets are allowed to remain in the manganous salt solution until all the voids thereof are filled or saturated with the solution. After such impregnation the formed catalyst particles are again calcined at temperatures of from between 700 and 1400° F., thereby converting the manganous salt to manganous oxide, activating it as a promoter material.

In order that the present invention may be more fully understood, the following examples are given primarily by way of illustration. No specific details or enumerations contained therein should be construed as limitations on the present invention except insofar as they appear in the appended claims. All parts and percentages are by weight unless otherwise specifically designated.

In the following examples, the commercial gas reforming catalyst referred to therein is a commercially available catalyst prepared in general in accordance with U.S.P. 2,825,700 containing about 20% of nickel oxide, an iron oxide content of 1.5% maximum and a sulfate ion concentration of 0.1% maximum. The balance of the catalyst composition is a calcined mixture of calcium aluminate cement and magnesium oxide. In the following examples this commercially available catalyst is in the form of a Raschig ring.

EXAMPLE 1

300 grams commercial gas reforming catalyst was calcined at 1100° F. for one hour to remove any absorbed water. After cooling to room temperature the catalyst was covered with 400 grams water containing 10 grams manganese oxide added as the nitrate. The catalyst was allowed to soak for 30 minutes, then drained of liquid, dried and calcined at 1100° F. The catalyst contained 1.3% manganese oxide.

EXAMPLE 2

300 grams of the commercially available reforming catalyst used in Example 1 was calcined at 1100° F. for one hour. This catalyst serves as a control for Example 1 in the test for effective gas reforming, the results of which are reported in Table I hereinafter.

EXAMPLE 3

A catalyst prepared substantially as in Example 1.

EXAMPLE 4

A catalyst was prepared as in Example 1 except that the amount of manganese oxide in the manganous salt impregnating solution was increased so that the final catalyst contained 2.7% manganese oxide.

EXAMPLE 5

The catalyst of Example 5 was a calcined unimpregnated control for demonstrating the significance of manganese oxide content in Examples 3 and 4.

EXAMPLE 6

A catalyst was prepared in which manganese nitrate was added during the manufacture of the catalyst, that is, in the mulling step before the catalyst is formed by extruding into its final ring form, and finished by calcining. This catalyst contained 1.3% of manganese oxide.

EXAMPLE 7

The catalyst of Example 7 is a calcined control of the commercially available reforming catalyst.

The catalysts were tested by a standard test in which the catalyst is mixed with an equal amount of inert material, heated to 800° C. and steamed at this temperature for 16 hours. Purified natural gas containing 96% methane and steam are passed over the catalyst at 800° C., a space velocity of 300 v./v./hr. and a steam-to-gas ratio of 4/1. The test is continued until the percent methane in the exit gas as determined by an infrared analysis levels off and remains constant for two hours. The lower the amount of methane in the exit gas under these conditions, the better the catalyst. Results of tests on the examples are given in Table I.

Table I

| Example No. | Percent MnO | Exit Methane, percent |
|---|---|---|
| 1 | 1.3 | 2.0 |
| 2 | 0 | 3.5 |
| 3 | 1.3 | 1.0 |
| 4 | 2.7 | >10.0 |
| 5 | 0 | 1.8 |
| 6 | 1.3 | 3.4 |
| 7 | 0 | 3.2 |

By comparing Examples 1 and 2 of Table I hereinabove, it will be seen that the catalyst containing 1.3% manganese oxide added by impregnating the calcined catalyst is significantly improved over a similar catalyst containing no manganese oxide. By comparing Examples 3, 4 and 5, it will be seen that the inclusion of 2.7% manganese oxide would appear to result in an inferior catalyst insofar as the percent of exit methane is concerned. Comparing Examples 3 and 5, it will be seen that the inclusion of manganese oxide within the range contemplated by this invention results in a substantial improvement in exit methane.

By comparing Examples 6 and 7, it will be seen that no significant improvement is obtained by incorporating the manganese oxide into the catalyst composition prior to calcination as required in the present invention.

We claim:

1. A process for preparing a catalyst for reforming lower hydrocarbons with steam which comprises preparing a calcined formed catalyst base material from nickel carbonate and a hydraulic cement, impregnating said calcined formed catalyst base with from between about 0.5 to about 2.5% of manganous oxide as a manganese compound capable of being converted to its oxide upon calcination, and thereafter calcining said impregnated base.

2. A process for preparing a catalyst for reforming lower hydrocarbons with steam which comprises preparing a calcined formed catalyst base material from nickel carbonate and a hydraulic cement, impregnating said calcined formed catalyst base with an effective amount of a manganese compound capable of being converted to its oxide upon calcination, and thereafter calcining said impregnated base to form a catalyst, said catalyst containing from between 10 and 40% of nickel oxide and 0.5 and 2.5% of manganese oxide.

3. A process for preparing a catalyst for reforming lower hydrocarbons with steam which comprises preparing a calcined extruded catalyst base material from nickel carbonate and a hydraulic cement, impregnating said calcined extruded catalyst base with an effective amount of a manganese compound capable of being converted to its oxide upon calcination, and thereafter calcining said impregnated extruded catalyst base to form a catalyst, said catalyst containing from between 15 and 30% of nickel oxide and .5 and 1.5% of manganese oxide.

4. A process for reforming lower hydrocarbons with steam at temperatures of from 400 to 1000° C. which comprises contacting said hydrocarbons and steam with a catalyst comprising from between 15 and 30% of nickel oxide, from between .5 and 2.5% of manganous oxide and the balance being essentially a cement binding agent, said manganous oxide being added to the catalyst by impregnating a calcined formed base comprising said nickel oxide and cement binding agent with a manganese salt and thereafter calcining said impregnated calcined base.

5. A process for reforming lower hydrocarbons with steam at temperatures of from 400 to 1000° C. which comprises contacting said hydrocarbons and steam with a catalyst comprising from between 15 and 30% of nickel oxide, from between .5 and about 1.5% of manganous oxide and the balance being essentially a cement binding agent, said manganous oxide being added to the catalyst by impregnating a calcined formed base comprising said nickel oxide and cement binding agent with a manganese salt and thereafter calcining said impregnated calcined base.

6. A catalyst composition comprising between about 15 and about 30% of nickel oxide, between about .5 and about 1.5% of manganous oxide and a cement binding agent, said manganous oxide being added to the catalyst by impregnating a calcined formed base comprising said nickel oxide and cement binding agent with a manganese salt and thereafter calcining said impregnated calcined base.

7. A catalyst composition comprising between about 15 and 30% of nickel oxide, between about .5 and 2.5% of manganous oxide, and a cement binding agent, said manganous oxide being added to the catalyst by impregnating a calcined formed base comprising said nickel oxide and cement binding agent with a manganese salt and thereafter calcining said impregnated calcined base.

References Cited in the file of this patent

UNITED STATES PATENTS

| | | |
|---|---|---|
| 1,673,032 | Williams | June 12, 1928 |
| 2,038,566 | Huettner | Apr. 28, 1936 |
| 2,692,192 | Martin | Oct. 19, 1954 |
| 2,783,133 | Eastwood | Feb. 26, 1957 |